F. H. DOANE.
MOTOR TRUCK.
APPLICATION FILED FEB. 23, 1912.

1,033,556.

Patented July 23, 1912.

Witnesses:
R. S. Berry
Thos. Costberg

Inventor:
Frank H. Doane
By G. H. Strong
Atty.

UNITED STATES PATENT OFFICE.

FRANK H. DOANE, OF SAN FRANCISCO, CALIFORNIA.

MOTOR-TRUCK.

1,033,556.  Specification of Letters Patent.  Patented July 23, 1912.

Application filed February 23, 1912. Serial No. 679,238.

*To all whom it may concern:*

Be it known that I, FRANK H. DOANE, a citizen of the United States, residing in the city and county of San Francisco and State of California, have invented new and useful Improvements in Motor - Trucks, of which the following is a specification.

This invention relates to a truck and particularly pertains to the axle and spring construction of low-down motor trucks for hauling heavy packages.

It is the object of this invention to provide a motor truck or dray having a rear cranked axle and spring system for the bed or body of the motor truck, which is so constructed and arranged that the bed or truck platform will set extremely low and be supported normally with light load upon semi-elliptic springs on the wheel axle; auxiliary heavy springs being provided and so disposed between the truck body or bed and the axle as to act to cushion the truck body when the latter is heavily loaded.

Another object is to provide a construction of the above character which is compact and durable and which is readily accessible for repairs.

The invention consists of the parts and the construction and combination of parts as hereinafter more fully described and claimed, having reference to the accompanying drawings, in which—

Figure 1:
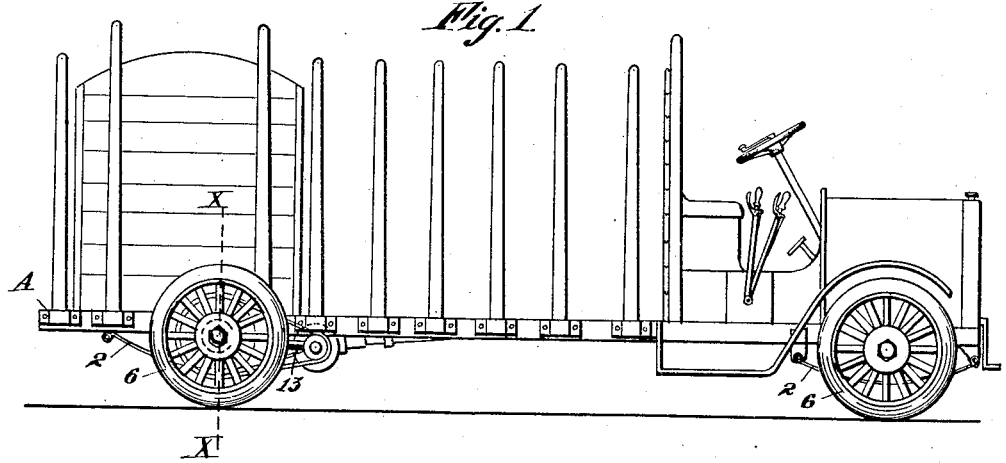
Figure 2:
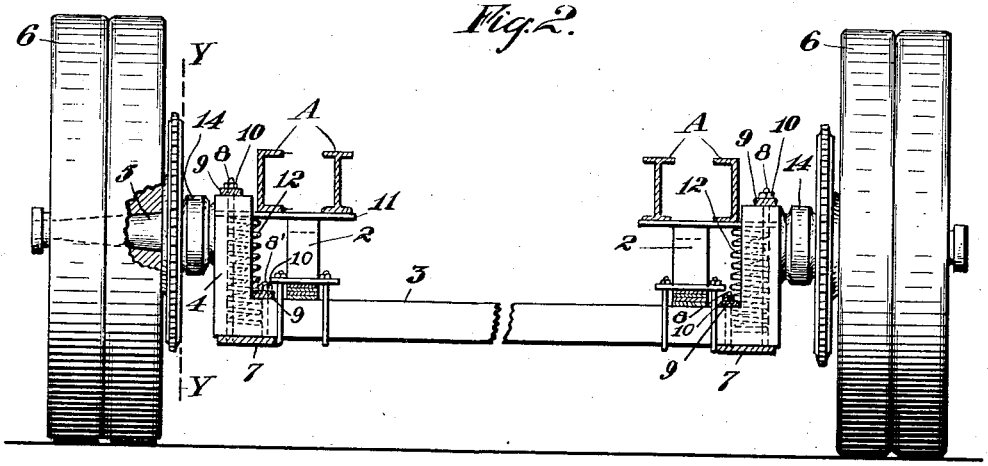
Figure 3:
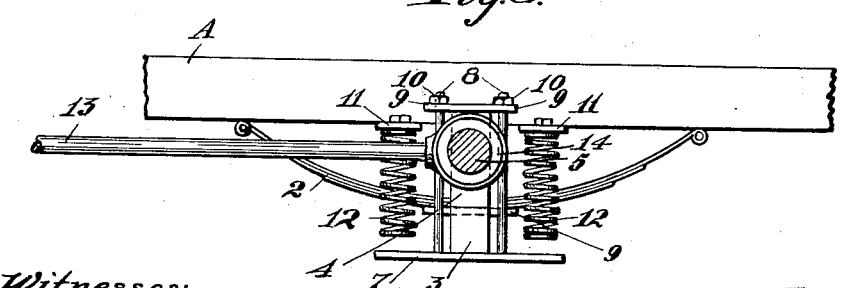

Figure 1 is a side elevation of a truck, showing the invention as applied. Fig. 2 is a vertical section partly in elevation on the line X—X, Fig. 1. Fig. 3 is a detail section and elevation on the line Y—Y, Fig. 2.

In the drawings A represents the bed or platform of the truck body, which may be of any suitable construction, the front and rear portions of which are supported upon semi-elliptic springs 2 mounted on axles 3 extending beneath the bed A. The empty bed is normally supported on these springs.

The rear axle 3 is cranked upwardly at the ends at 4—4 and dropped between its ends, so as to be below the centers of the wheel hubs; the upwardly projecting portions 4 of the axle 3 extending alongside the outer face of the side members of the bed A, as shown in Fig. 2. Wheel spindles 5 are mounted on the upwardly projecting portions 4—4 of the axle 3 and designed to receive the hubs of wheels 6 of any suitable description which are revolubly mounted thereon.

Mounted on each end of the horizontal middle portion of the axle 3 and beneath the upwardly projecting portions 4, is a plate 7, the outer ends of which project beyond the outer faces of the axles 3, as shown in Fig. 3. These plates 7 form stops or seats for the auxiliary springs 12, as will be shortly described. The plates 7 are held in position on the axle by means of stirrups, consisting of bolts 8 and 8' and plates 9; the bolts being secured to the plates 7 and extend upwardly parallel with and adjacent the side faces of the axle 3, and the bolts 8—8' passing through plates 9—9 disposed on the upper end of the upwardly projecting portions 4 of the axle 3, and secured thereto by means of nuts 10.

Mounted on the bed A and extending on each side of the upwardly projecting portions 4 on the axles 3 are brackets 11, which are here shown as consisting of flat plates bolted to the underside of the side sills of the bed A. Mounted on the brackets 11, so as to always be carried by the bed and depending therefrom are a pair of helical compression springs 12, the lower ends of which terminate a short distance above the upper face of the outwardly projecting portions of the stop plates 7 on the axle 3, as shown in Fig. 3, and on each side of the upwardly projecting portion 4 of the axle. These springs are used to carry the load and supplement the elliptical springs 2. Ordinarily no weight rests on the springs 12, but in hauling a load they carry the principal weight. Radius rods 13 connect the bed A to the spindles 5 on the axles 3 to prevent longitudinal movement of the bed in relation to the wheel axles 3; one end of the radius rods 13 being pivotally connected to the jack shaft on the bed A and the other end attached to a sleeve 14 mounted on the spindles 5.

The truck body, when empty or slightly loaded, is supported entirely upon the semi-elliptic springs 2, which serve to cushion the vertical movement between the truck body and the axle 3 in the usual manner, but when the truck is heavily loaded, so as to deflect the semi-elliptic springs 2 sufficiently far to bring the lower ends of the helical springs 12 into contact with the plate 7, the latter springs will act in conjunction with the semi-elliptic springs to support the load.

From the foregoing it will be seen that the semi-elliptic springs being light, will provide against jolting when the truck is empty, thereby protecting the mechanism of the truck, and that, when the truck is loaded, the helical springs, which offer greater resistance to compression and have a greater carrying capacity than the semi-elliptic springs, will carry the heavy load.

By forming the wheel axle 3 with the central drop portions and the end crank portions 4—4 extending on each side of the bed A and disposing the spring members 2 and 12 as described, I am able to produce a truck, the platform or body of which may be set extremely low. The provision of a double series of springs, one series to support light loads and the other to support heavy loads, makes it possible to position the truck body very close to the axles.

Having thus described my invention, what I claim and desire to secure by Letters Patent is—

An improved motor truck, including a bed, a drop-axle having cranked ends between which the bed is disposed, semi-elliptic springs on the axle supporting the bed, brackets on the bed extending to each side of the cranked portions of the axle, helical springs depending from said brackets and disposed on each side of the upturned ends of the axle, abutment plates on the axle each extending to the opposite sides of an adjacent cranked portion thereof, said extended portions being disposed in the path of the helical springs so as to engage these springs when the semi-elliptic springs are depressed a distance corresponding to the space between the helical springs and the abutment plates.

In testimony whereof I have hereunto set my hand in the presence of two subscribing witnesses.

FRANK H. DOANE.

Witnesses:
CHARLES EDELMAN,
S. B. RUSSELL.

Copies of this patent may be obtained for five cents each, by addressing the "Commissioner of Patents, Washington, D. C."